(12) United States Patent
Varshney et al.

(10) Patent No.: US 10,963,355 B2
(45) Date of Patent: Mar. 30, 2021

(54) AUTOMATED AND DYNAMIC VIRTUAL MACHINE GROUPING BASED ON APPLICATION REQUIREMENT

(71) Applicant: International Business Machines Corporation, Armonk, NY (US)

(72) Inventors: Taru Varshney, Gopanpally (IN); Jes Kiran Chittigala, Kukatpally (IN); Srikanth Thanneeru, Nehru Nagar Suryapet (IN); Ravi A. Shankar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 16/202,681

(22) Filed: Nov. 28, 2018

(65) Prior Publication Data

US 2020/0167248 A1 May 28, 2020

(51) Int. Cl.
*G06F 11/00* (2006.01)
*G06F 11/20* (2006.01)
(Continued)

(52) U.S. Cl.
CPC ........ *G06F 11/2023* (2013.01); *G06F 9/5077* (2013.01); *G06F 11/1451* (2013.01);
(Continued)

(58) Field of Classification Search
CPC ............. G06F 11/2023; G06F 11/1451; G06F 11/1469; G06F 11/0712; G06F 11/0709;
(Continued)

(56) References Cited

U.S. PATENT DOCUMENTS 7,383,463 B2* 6/2008 Hayden ............... G06F 11/2069
714/4.11
9,652,333 B1* 5/2017 Bournival ............. G06F 3/0647
(Continued)

OTHER PUBLICATIONS

Khan et al., "Workload characterization and prediction in the cloud: A multiple time series approach", 2012 IEEE Network Operations and Management Symposium, Maui, HI, USA, Date of Conference: Apr. 16-20, 2012, https://www.cs.ucsb.edu/~xyan/papers/noms12_cloudman.pdfm, pp. 1-8.

*Primary Examiner* — Joseph D Manoskey
(74) *Attorney, Agent, or Firm* — Scully, Scott, Murphy & Presser, P.C.; David Quinn, Esq.

(57) ABSTRACT

A system and method for automatic and dynamic virtual machine (VM) group membership adjustment to identify and maintain VM groupings for maintaining a data consistency and availability at a computer recovery site in response to a disaster event. Based on a hybrid approach of network and storage analytics using cognitive methods, the system automatically groups the VMs based on patterns of data exchanged between the VMs. The system can store the patterns found during the analysis, find the critical elements in those patterns (like VMs playing the key role of DB server), match the patterns and use them in case a detected failure to make the system functional again at the recovery site. The system stores the communications traffic patterns learned during the network analysis and uses analytics to form or change the VM grouping, and can perform the pattern matching to quickly readjust the group.

20 Claims, 8 Drawing Sheets

(51) Int. Cl.
*G06F 9/50* (2006.01)
*G06F 11/14* (2006.01)
*H04L 29/12* (2006.01)
*H04L 12/24* (2006.01)
*H04L 12/26* (2006.01)
*G06F 9/455* (2018.01)

(52) U.S. Cl.
CPC .......... *G06F 11/1469* (2013.01); *H04L 41/08* (2013.01); *H04L 43/08* (2013.01); *H04L 61/2007* (2013.01); *G06F 9/45558* (2013.01); *G06F 2009/45562* (2013.01); *G06F 2201/805* (2013.01); *G06F 2201/815* (2013.01); *G06F 2201/82* (2013.01); *G06F 2209/502* (2013.01)

(58) Field of Classification Search
CPC ............... G06F 11/142; G06F 11/1425; G06F 11/1456; G06F 11/203; G06F 11/301; G06F 9/5077; G06F 9/45558; G06F 2009/45562; G06F 2201/805; G06F 2201/815; G06F 2201/08; G06F 2209/502; H04L 41/08; H04L 43/08; H04L 61/2007
See application file for complete search history.

(56) References Cited

U.S. PATENT DOCUMENTS

| | | | |
|---|---|---|---|
| 2006/0230103 A1* | 10/2006 | Takamoto | H04L 67/1097 709/203 |
| 2012/0167094 A1 | 6/2012 | Suit | |
| 2014/0189429 A1 | 7/2014 | Gill et al. | |
| 2015/0186177 A1 | 7/2015 | Anderson et al. | |
| 2015/0363238 A1* | 12/2015 | Bai | G06F 9/5022 718/1 |
| 2016/0357643 A1* | 12/2016 | Bachu | G06F 9/45558 |
| 2017/0060608 A1 | 3/2017 | Raghunathan et al. | |
| 2018/0157561 A1* | 6/2018 | Venkatesh | G06F 8/65 |

* cited by examiner

AUTOMATED AND DYNAMIC VIRTUAL MACHINE GROUPING BASED ON APPLICATION REQUIREMENT

FIELD

The present invention relates generally to disaster recovery (DR) operations in computer systems, and in particular to a system and method for grouping virtual machines (VMs), and in particular, to a system and method for dynamically forming a virtual machine (VM) group and associated memory storage resources and dynamically readjusting the group members in case of failure of critical VMs using cognitive analytics for use in maintaining data consistency in disaster recovery.

BACKGROUND

For Disaster Recovery (DR) a critical aspect is grouping the VMs (Virtual Machines) to control the set of VMs that will move together to a disaster recovery or back-up site in case of disaster at an active host computing site.

Presently, a user has to manually group the VMs that will be maintained and recovered in case of a disaster at the recovery site.

SUMMARY

According to at least one embodiment of the present invention there is provided a computer-implemented system and method for dynamically generating a VM grouping based on the applications running on the VMs and cognitive analytics of network statistics and IP packets exchanged between the VMs.

In the dynamic VM grouping approach, cognitive analytics are used to identify the related VMs based on the analytics of data exchanged between the VMs and a degree of matching the learned patterns to automatically group the VMs. The computer system, method and computer program products described herein provide for dynamic VM grouping employing a cognitive approach to identify the related VMs to form or change the group, and can perform a pattern matching to quickly readjust the group and memory storage disk requirements at an active host site.

The patterns found can be stored and used, during the analysis, to find the critical elements in those patterns, will match the patterns, and use them in case of any failures to make the system functional again.

In one aspect, there can be multiple VMs present on various host computers in the site. In case of a disaster event at the active site, dynamic VM grouping will allow the movement of the member VMs to a host computer at a data recovery site while still maintaining the data consistency at the storage level. Grouping of VM also facilitates a close monitoring of the critical VMs and can be used to selectively leave out other VMs that do not need to be controlled and backed up.

In one aspect, there is provided a method for or configuring a one or more host computers. The method comprises: configuring, using a control processor, at the one or more host computers, a current network grouping of VMs and an amount of memory storage resources to be hosted by one or more host computers located at a first location and on a recovery site at a second location in case of a disaster; monitoring, using the control processor, internet protocol (IP) packet exchange patterns amongst VMs of the current network grouping of VMs at the one or more host computers at the first location; identifying, by the control processor, based on the monitored IP packet exchanges among the VMs, a critical grouping of VMs and current memory storage resources at the host computing system running critical elements necessary to maintain a data consistency at the recovery site; detecting, at the control processor of the computing system, an occurrence of a disaster event terminating operations of the configured VMs or terminating memory storage resource in the current network grouping of VMs at the one or more host computers at the first location; and in response to the detecting, automatically configuring, using the control processor, one or more host computers at the recovery site to host a related grouping of VMs and the corresponding amount of memory storage resources matched to the critical grouping of VMs and current memory storage resources at the host computing system necessary to maintain a data consistency in response to the disaster event.

In a further aspect, there is provided a disaster recovery system for a datacenter running one or more host computers at a first location. The system comprises: a computer system having a control processor, a memory storage unit associated with the computer system, the memory storage unit storing instructions that are run at the control processor to configure the control processor to: configure at the one or more host computers, a current network grouping of VMs and an amount of memory storage resources to be hosted by one or more host computers located at a first location and on a recovery site at a second location in case of a disaster; monitor internet protocol (IP) packet exchange patterns amongst VMs of the current network grouping of VMs at the one or more host computers at the first location; identify based on the monitored IP packet exchanges among the VMs, a grouping of VMs and current memory storage resources at the host computing system running critical elements necessary to maintain a data consistency at the recovery site; detect an occurrence of a disaster event terminating operations of the configured VMs or terminating memory storage resource in the current network grouping of VMs at the one or more host computers at the first location; and in response to the detecting, automatically configure one or more host computers at the recovery site to host a related grouping of VMs and the corresponding amount of memory storage resources matched to the critical grouping of VMs and current memory storage resources at the host computing system necessary to maintain a data consistency in response to the disaster event.

In a further aspect, there is provided a computer program product for performing operations. The computer program product includes a storage medium readable by a processing circuit and storing instructions run by the processing circuit for running a method. The method is the same as listed above.

Embodiments of the invention will be described in more detail below, by way of illustrative and non-limiting example, with reference to the accompanying drawings.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
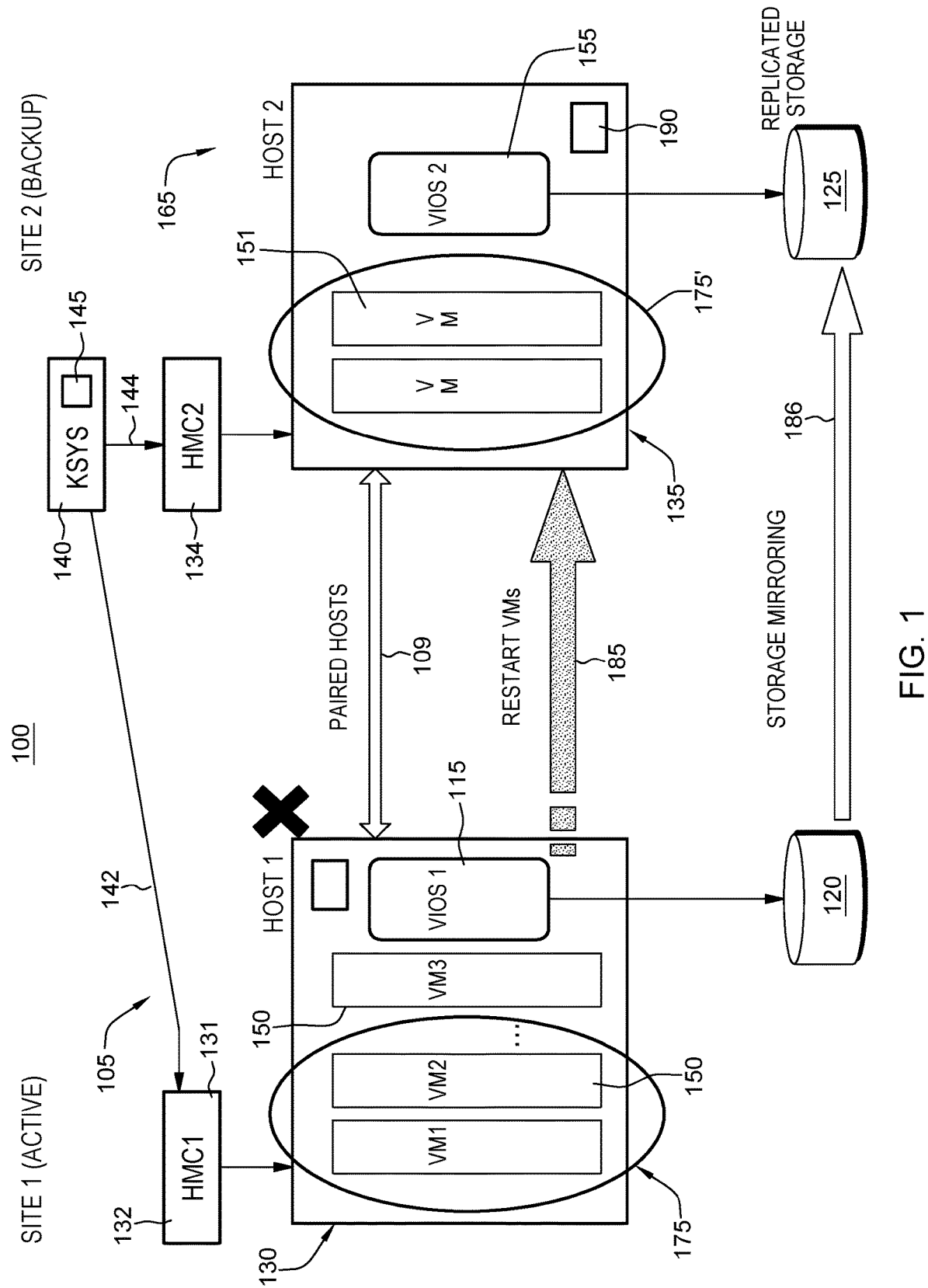
FIG. 1 depicts a disaster recovery (DR) system including first "active" site and a geographically separated second backup or recovery site according to embodiments.

FIG. 1 depicts a disaster recovery (DR) system 100 including first "active" site 105 and a second geographically separated backup or recovery site 165. The first "active" site 105 provides a deployment of virtual machines (VMs) 150 and related virtual machine processing infrastructure including one or more host computing systems 130, e.g., servers, each hosting one or more virtual machine instances 150. The host system 130 may further run a virtual input/output server (VIOS) 115 which is a program that facilitates the sharing of physical I/O resources between logical partitions, e.g., of groups of VMs 175, operating on processors within the host server, and provide advanced virtualization capabilities across other client logical partitions (LPARs). Additionally running on server 130 is a hypervisor or like virtual machine monitor application 132 that creates and runs the multiple virtual machines as guests to provide the VM system with the host server's hardware's processor, memory and resources. Further shown in computing datacenter site 105 is a storage area network or like data storage devices 120 for storing data generated at the data center.

The second recovery site 165 is a remotely located disaster recovery site that includes similar hardware computing system elements for enabling backing up and providing VM data center site recovery service for the protected (active) site 105. DR site 165 deploys virtual machines and related virtual machine processing infrastructure including one or more host computing systems 135, e.g., servers, each hosting one or more virtual machine instances 151, a VIOS application 155, a hypervisor or like virtual machine monitor 134 that creates and runs the multiple virtual machines as guests to provide the VM system with a host server's hardware's processor, memory and resources. Further shown in computing DR site 165 is a storage area network or like data storage facilities 125 for replicated data storage including a storage mirror of contents of the storage system 120.

Host server 130 at site 105 is connected via a disaster recovery network to the second host server 135. In embodiments, host servers 105 and 165 are "paired" for direct data network connection 109 according to one or more system and performance requirements and/or storage features, or other criteria. The network connection enables disaster recovery operations upon detection of a failed host server 130 and, at the second host (backup or recovery) host server 135, enables a restoring of a current grouping of virtual machines (VMs) such as the group of VMs 175 and a restoring of the operations that were interrupted at the failed host server 130 in a manner that ensures application and data consistency.

As further shown in FIG. 1, a system controller (KSYS) process 140 is a controlling authority in the DR system 100 and is an application performing all the analysis and control functionality at both active and recovery data center sites. In an embodiment, a control element KSYS 140 is a binary file running on the disaster recovery network computer system that manages disaster recovery operations for system 100. As shown, KSYS program 140 controls via communication channels 142, 144, a respective dedicated hardware management controller or hypervisors 132, 134, associated with each respective operating host server 130 and backup site host server 135, which each controls and configures physical hardware and resources at the respective host.

In embodiments, upon detecting a failure at host server 130 at active site 105, the KSYS recovery manager application 140 will control the recovery of the same VM group 175' on the backup/recovery site 165. In a disaster recovery operation, e.g., when a protected site 105 goes offline unexpectedly, a KSYS binary 190 running at the second site 165 performs VM site disaster recovery operations, e.g., by configuring replication services in order to recover virtual machine workloads and datastores from the storage area network (SAN) 120. In one embodiment, replication of VMs at the recovery site 165 can be orchestrated by user-specified scripts or a recovery plan that can perform custom recovery actions to restore one or more or groups of VM instances, e.g., in a specific order, with specific dependencies, and migrate workloads 185 and data stores 186 to the recovery site.

In an embodiment, the disaster recover control system KSYS process 140 additionally invokes a network analytics engine 145. Analytics engine 145 is programmed to analyze the nodes (VMs) that are part of and created on the central electronics complex of a disaster recovery environment 100, i.e., the physical collection of hardware that includes main storage devices, one or more central processors, timers, and communications channels. The KSYS leverages cognitive abilities to identify and generate VM groups and dependent docker(s) (lighweight container(s) which run in the same operating system as the host which shares host operating system resources and manages networking) to maintain consistency at storage level during disaster recovery based upon a combination of network traffic and storage level disk group relations.

The system and methods provide automated and dynamic VM grouping with a hybrid approach using network statistics combined with storage configurations and to dynamically adjust the group in case of failure of critical VMs. Additional features include the ability to predict the best possible VM group for DR and then automatically maintain it in case of failure of VMs to keep the VM group functional with all with key elements or services on VMs operational. Further, a new VM is added to the group when the network communication pattern or storage consistency pattern indicates the presence of new related VM.

Figure 2:
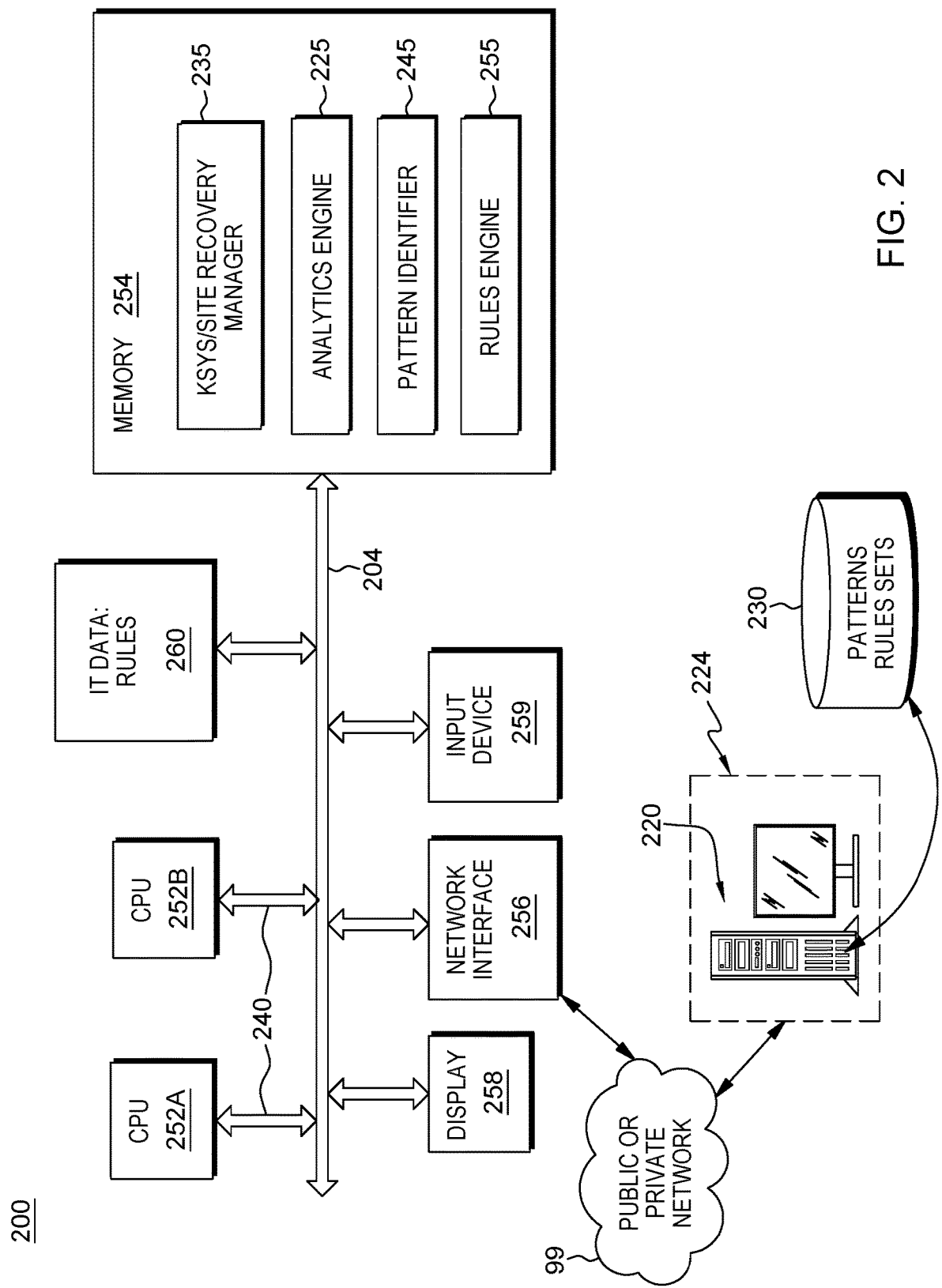
FIG. 2 is a generalized schematic of a computer system shown in the DR system depicted in FIG. 1.

Referring now to FIG. 2, there is depicted a computer system 200 embodying, for example, a KSYS controller, providing the ability for grouping VMs based upon a cognitive analysis according to the embodiments herein. In some aspects, system 200 may include a computing device, a mobile device, or a server 130 such as shown in FIG. 1. In some aspects, system 200 may include, for example, servers, personal computers, laptops, tablets, smart devices, smart phones, or any other similar computing device.

Computing system 200 includes one or more hardware processors 252A, 252B, a memory 254, e.g., for storing an operating system and program instructions, a network interface 256, a display device 258, an input device 259, and any other features common to a computing device. In some aspects, computing system 200 may, for example, be any computing device that is configured to communicate with a web-site 224 or web- or cloud-based server 220 over a public or private communications network 99. Further, as shown as part of system 200, are stored historic information technology data (IT data) such as including, but not limited to: resource usage, transactions among VMs, IT events received, I/O communication patterns and source traffic patterns, user selection patterns, etc.) and derived rule sets, including user-defined rules to govern VM recovery, which are stored locally in an attached memory storage device 260, or stored in an attached, or a remote memory storage device 230, e.g., a database, and accessed via a remote network connection for input to the system 200.

In the embodiment depicted in FIG. 2, processors 252A, 252B may include, for example, a microcontroller, Field Programmable Gate Array (FPGA), or any other processor that is configured to perform various operations. Additionally shown are the communication channels 240, e.g., wired connections such as data bus lines, address bus lines, Input/Output (I/O) data lines, etc., for routing signals between the various components of system 200 over bus 204. Processors 252A, 252B may be configured to execute instructions as described below. These instructions may be stored, for example, as programmed modules in memory storage device 254.

Memory 254 may include, for example, non-transitory computer readable media in the form of volatile memory, such as random access memory (RAM) and/or cache memory or others. Memory 254 may include, for example, other removable/non-removable, volatile/non-volatile storage media. By way of non-limiting examples only, memory 354 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 256 is configured to transmit and receive data or information to and from a web-site server 220, e.g., via wired or wireless connections. For example, network interface 256 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 200 to transmit information to or receive information from a server.

Display 258 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 258 may include a liquid crystal display (LCD), an e-paper/e-ink display, an organic LED (OLED) display, or other similar display technologies. In some aspects, display 258 may be touch-sensitive and may also function as an input device.

Input device 259 may include, for example, a keyboard, a mouse, a touch-sensitive display, a keypad, a microphone, or other similar input devices or any other input devices that may be used alone or together to provide a user with the capability to interact with the computing device 200.

With respect to the ability of computer system 200 for automatically leveraging cognitive abilities to identify and generate VM groups of dependent VMs to maintain consistency at storage level during disaster recovery, the memory 260 may be configured for storing VM recovery rules, historical IT data, traffic patterns data that associate with different VM groups, etc. As mentioned, this memory 260 may be local to the computer or mobile device system 200, or otherwise, embodied as a database 230 associated with the remote server 220, over a network.

Computer system 200 is further equipped with a memory 254 storing processing modules that include programmed instructions adapted to invoke operations for analyzing the active site 135 of system 100. That is, processing modules include programmed instructions adapted to invoke operations for 1) automatically forming the VM groups based on the cognitive analytics, e.g., network analytics, of data exchanged (e.g., IP transmissions) between the VMs 150 at the active site; 2) providing the facility for user to specify some high level rules (e.g., SAP HANA Database server/client should be configured etc), and using those rules to automatically group the VMs; 3) verifying that each VM in the proposed group also meets all the requirement to recover it on backup site in case of disaster; and 4) adjusting the VM group membership based on the dynamic behavior of the applications.

In one embodiment, one of the programmed processing modules stored at the associated server memory 254 include a machine learning analytics engine 225 that when run by a processor at server 130, configures the system for cognitively analyzing the historic IT data (e.g., resource usage, transaction, IT event, I/O patterns and source traffic, and/or user-selected patterns) to find the relationship of VMs and dockers at the active site. In an embodiment, analytics engine 225 uses a combination of network traffic and storage level disk group relations to identify VM group of dependent dockers to maintain consistency at storage level during disaster recovery.

In one embodiment, one of the programmed processing modules stored at the associated server memory 254 further includes a pattern identifier module 245 that, when run in conjunction with network analytics performed by the analytics engine 225 by a processor at server 130, configures the system for identifying communications patterns and I/O patterns of packets received at and transmitted by VMs and memory resource requirements for different VM network configurations and client/server models at the active site. The analyzing and pattern identifying occurs in real time for the current network configuration of VMs and memory storage disks. Additionally, analyzing and pattern identifying can occur off-line based on historic data of communications patterns and I/O patterns of packets received at and transmitted by VMs and memory storage resource requirements associated with prior VM network configurations. Whether occurring in real-time or off-line, the analyzed and identified patterns are used as a basis for defining rules for configuring VM groups based on the detected patterns.

In one embodiment, one of the programmed processing modules stored at the associated server memory 254 further includes a rules engine 255 that when run by a processor at server 130, configures the system for receiving a user's entry of a rule (e.g., user-defined rules) that can govern disaster recovery operations at the recovery site 165, or automatically generating rules to group VMs for disaster recovery based on analytics results and identified patterns.

As further shown in FIG. 2, in one embodiment, one of the programmed processing modules stored at the associated server memory 254 include a KSYS disaster recovery manager module 235, that when run, e.g., by a processor at server 130, configures the system to invoke operations for automating the restoring of virtual machines at the second local or remote recovery site based on system-defined rules or user-defined rules in the case of a disaster recovery scenario. In an embodiment, based on the information and VM configurations patterns learned from running analytics engine 225 and pattern identifier 245, the KSYS controller 235 dynamically controls the restoration of the VM environment at a recover site in case the operations at the active host system fails due to a disaster event. This control is configured to be automatic. The KSYS controller 235 maintains all the data of a currently configured active site including, for example, one or more hosts at the active site, all VMs running on those hosts, and storage information, and all of the applications that are currently running on the VMs in the active site, in the database maintained by the KSYS, including but not limited to: e.g., memory requirements, CPU requirements, storage adaptors, network adaptors in use at each virtual machine, etc.

In an embodiment, a rule may be user defined and specifies a VM network grouping of VMs and memory storage disk architecture that can be provisioned to run at one or more host computers at the active site that satisfies a particular application requirement and/or network model, e.g., a dB client-server model, a peer-to-peer (peer domain) model, a web-based service model, etc. At system 200, rules engine 255 invokes operations enabling a user to enter, via an interface at the system 200, a rule specifying a list of VMs to be grouped on one or more hosts, associated service application(s) (e.g., DB servers and DB and client applications) to be run and a corresponding memory resource configuration. The rule is subsequently invoked at the KSYS, e.g., to form VM group to configure a recovery site according to the current active configuration of grouped VMs and memory storage disks provisioned at the active host site.

An example rule can specify, for a dB client-server application model, a grouped configuration of VMs including a database (dB) server application running at a first VM, and multiple VMs, e.g., tens or hundreds of VMs, running database client applications at one or more servers. This rule can be accessed by the KSYS to form VM group and for use in configuring the same model at the recovery site in case of a disaster. Rules that define groups of VMs can further specify corresponding applications or logical partitions that run on the VM(s) and also specify dockers, containers or like virtualized operating system resource and specify any memory storage devices (e.g., disk drives) to maintain data consistency when restoring the virtual environment configuration at the recovery site. These VMs, dockers and memory storage requirements are specified in a rule as a group for re-creating a particular networking or application model for DR.

Figure 4:
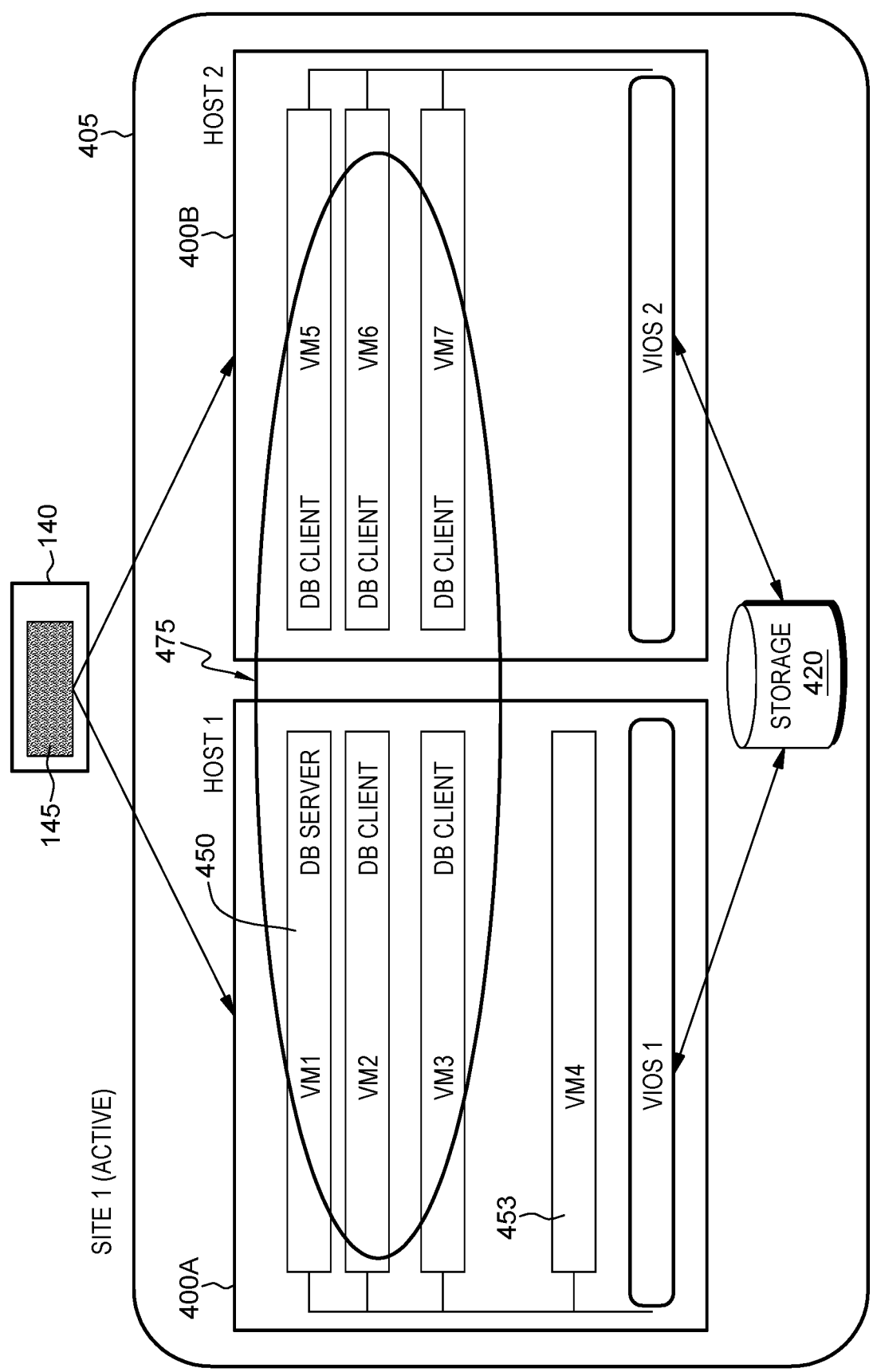
FIG. 4 depicts an example of a VM grouping based on user specified rule (Database(DB) server/client state) in an example implementation.

FIG. 4 depicts an example of a VM grouping based on a user-specified rule (e.g., a database(DB) server/client state that should be "active"). As shown in FIG. 4, a user-defined rule specifies a VM grouping 475 having VMs running at two active host sites 400A, 400B where a first VM 450, e.g., VM1, is specified at active host site 400A to install and run a database (dB) server application and where several VMs 451, e.g., labeled VM2, VM3, VM5, VM6, VM7 have been installed and run a dB client application. The virtual machine VM4 453 is currently not specified for use in this group. This rule may currently define corresponding memory storage units, e.g., at disk storage drive 420, to maintain data consistency under control of VIOS 1 (at active host server 400A) and VIOS 2 (at active host server 400B) applications running at the active site 405. Many such rules can be defined by users.

In an embodiment, a plurality of user-defined rules are stored at a memory storage device, a database, and are accessible by the KSYS 140. Based on the current configuration of VMs running applications at the active site, the specified rule or a related rule having a most closely-matched VM grouping, is automatically enforced at the KSYS to form VM group. Upon detection of a disaster recovery event in which case the disaster recovery processes will initiate appropriate hardware configuration commands for the HMC2 134 to automatically configure the network VM group and corresponding memory resource configuration, e.g., a dB client-server model, at the second host recovery site. Generally, in an event of a disaster (e.g., loss of power and back-up power or when data storage devices, CECs/VIOSes are down) at the active site configured with a VM grouping running a database server server-client model, the same group of VMs for running the same applications is configured at the second host (recovery) site using appropriate commands issued by the KSYS 140.

Generally, via the computer system interface of FIG. 2, a user can first specify some rules for automatic and dynamic VM grouping. For example, a user can: a) specify the models/roles an active site will support e.g., client server model, peer-to-peer model etc.; or b) specify rules in a requirement format, for example:
"Include the VM if any of the mentioned application(s) is(are) running"
and providing, in the rule, the full details of the daemon and any other prerequisites that need to be checked. For example, the user can specify to include the VM if a database server, e.g., SAP HANA platform, is running on the VM or if an SAP HANA database client is running on the VM. For more granularity user can specify the supported version for the applications also as a rule. Based on these rules the control system will identify the VMs on the site that meet the user requirements.

In an embodiment, the KSYS controller can also verify that these VM support all the requirements to perform disaster recovery on the backup recovery site, and verify the same storage accessibility can be configured, including verifying the presence of required processing units and required memory etc. After validating that all the requirements are specified as per user created rules and requirements for DR are satisfied, the control system will devise the set of VMs that can be grouped together for DR. If the user is satisfied with the list presented for the VM group, the user can accept the group.

Accordingly, the disaster recovery system is more user friendly and cost-effective as groups are more closely controlled based on the applications required to run on the VMs.

In an alternative embodiment, rules may be automatically or dynamically defined according to current VM groupings detected at the active host site. That is, system 200 can dynamically control the grouping of VMs for restoration. For example, KSYS 140 running analytics engine 145, can be used to automatically define a rule based on current detected network communication traffic patterns at the host servers, e.g., detected internet protocol (IP) packets exchanges involving the VMs, memory storage devices, and other entities in the active host site. Then, a rule defining a current "critical" grouping of VM entities for disaster recovery can be defined based on VMs that are running in a current VM network configuration.

In addition to detecting network communication patterns among VMs, there is detected current connections and input/output packet traffic patterns between VMs and a storage device, e.g., a number of hard disk drive resources to maintain data consistency associated with the group and which is to be restored with the VMs at the backup site in case of recovery. In the case of detecting that a VM is no longer connected to a storage device, this VM will be removed from the group in order to maintain data consistency at the data storage level.

Figure 3A:
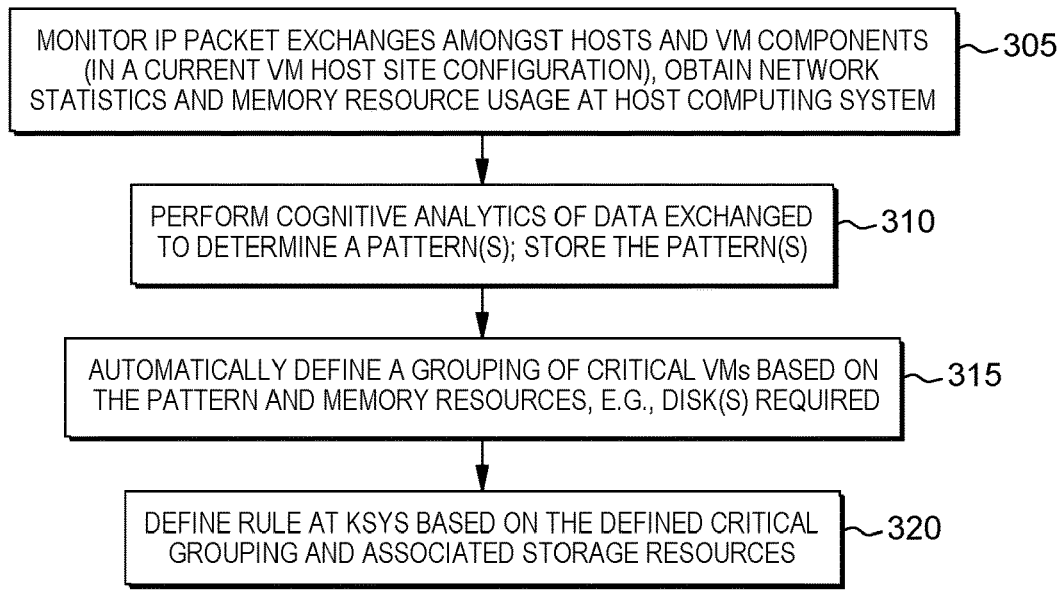
FIG. 3A depicts a flow chart indicating steps performed for VM grouping based on IP packets exchanged and other network statistics analysis.

FIG. 3A is a flow chart illustrating a method 300 automatically run at the KSYS analytics engine 145 for monitoring status, e.g., monitoring virtual machine instances, communications traffic and assorted resource groupings as currently configured at the active site. The KSYS control system 140 will analyze the network statistics and IP packet transmission among various VM nodes. For example, as shown at 305, analytics engine 145 at the KSYS controller 140 monitors network configurations (i.e., IP packet exchange patterns) at the active host and VM components at the current active host site 105.

In an embodiment, KSYS invokes analytics engine 145 to monitor and capture IP packet exchange patterns across VMs running at additional other active host sites. For example, analytics engine module 145 opens listener or server sockets at ports on the network to determine which client to connect to that port or endpoint. By listening on the endpoint using a "listen" method, it is determinable which VMs are communicating and sending network transmitted IP packets and which VMs are receiving the IP packets. The VM elements sourcing and sinking traffic are recorded as a pattern and stored.

Then, at 310, FIG. 3A, the analytics engine runs cognitive network analytic methods of the detected data exchanged to determine a pattern, e.g., a communications pattern. This pattern is stored and associated with a particular application model.

Based on current monitored/detected IP packet exchanges among the VMs and memory resources, e.g., storage disk(s), at 315, rules engine module can automatically determine a grouping of those "critical" VMs and current memory storage resources for the current configuration at the host computing system necessary to maintain a data consistency for the current network configuration at the active host site. This critical grouping can be a sub-set of the amount of VMs currently deployed at the active site.

Alternatively, at 315, based on the detected pattern in the detected packet exchanges and memory resources, e.g., disk(s) required, the system can automatically detect an update to an existing group including VMs and define a new rule based on the modified rule.

Once, at 315, a group of critical VMs forming a current VM network configuration according to a current requirement or model criteria is defined, the system can proceed to step 320, FIG. 3A, where the rules engine can automatically define a rule based on the current defined critical VM grouping and hardware memory storage resources. Via a system interface, the rules engine may suggest the automatically defined additional groupings of VMs to the user, and the corresponding hardware memory storage resources, and the user may define the rule based on the critical VM grouping. The defined VM group information can be stored locally at, or accessed remotely by, the KSYS 140 for use to automatically configure/restore a VM network and storage configuration at a recovery site.

Figure 5A:
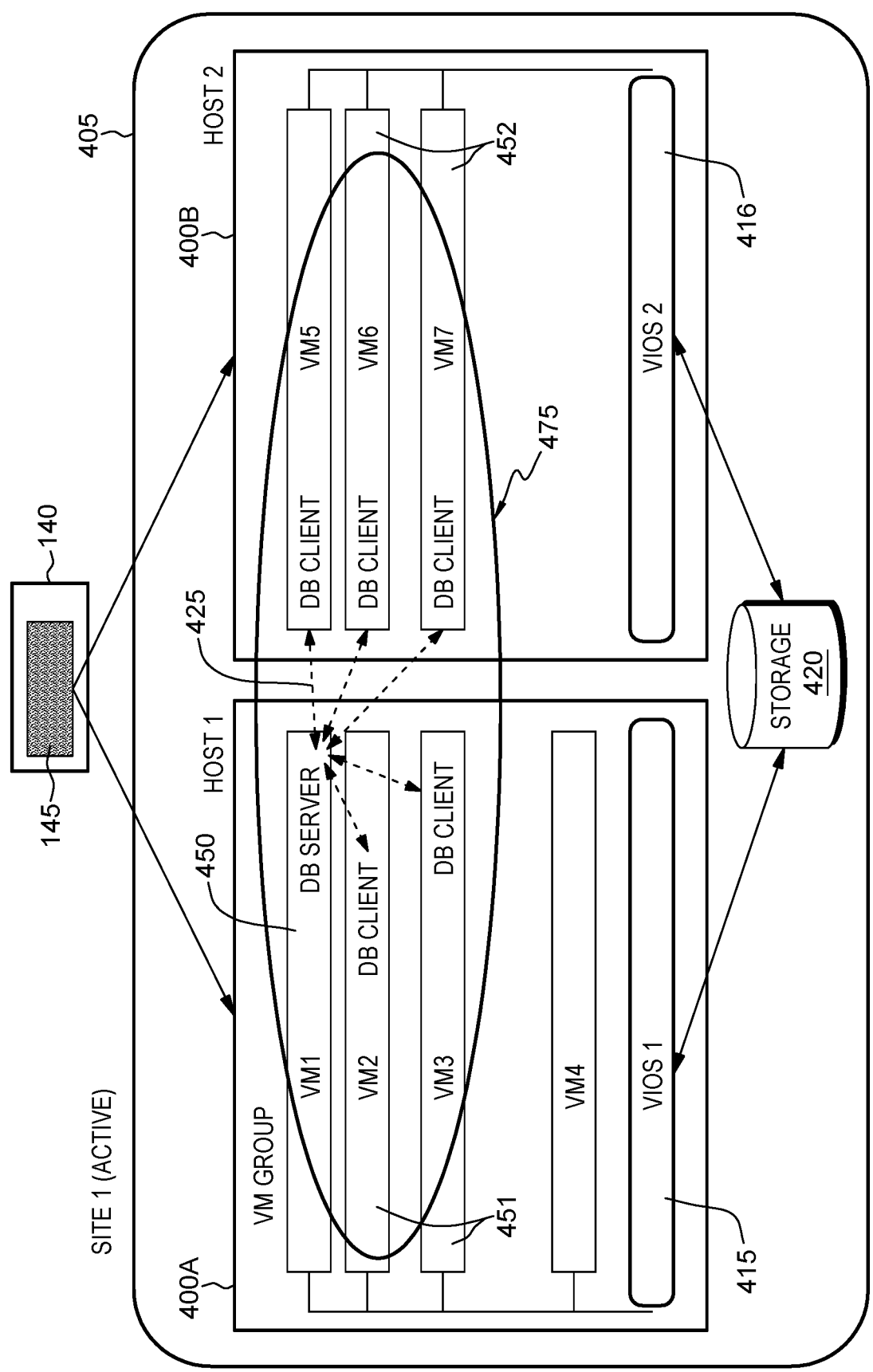
FIG. 5A depicts an example KSYS analytics engine for monitoring status of VMs at an active site and the grouping of VMs based on IP packets exchanged and other network statistics analysis.

FIG. 5A depicts an example KSYS controller 140 running a cognitive analytics engine 145 for automatically monitoring status of VMs at two active hosts belonging to same site 400A, 400B, and for dynamically grouping of VMs based on IP packets exchanged 425 and other network statistics analyses, e.g., socket ports opened and listening, routing tables, etc. Based on the network analysis results, the system identifies the nodes that are communicating with each other. There is a high probability that these nodes are dependent or are "peers" and need to work together to achieve a goal or to provide a solution to the client.

As shown in the example VM system monitoring at the host sites 400A, 400B shown in FIG. 5A, the analytic engine 145 can determine that a VM 450, e.g., VM1, currently active at host site 400A, has installed and runs a database (dB) server application client and that several VMs 451, e.g., labeled VM2, VM3, have installed and run a dB client application. Analytic engine 145 can determine that, based on packet exchanges with db server at VM 450, that VMs 452, e.g., labeled VM5, VM6, VM7 currently active at host site 400B have installed and run a database (dB) server application client. The analytics engine will automatically group together all the related nodes identified and define the VM1-VM7 virtual machines into one a dB client server model group 475.

In addition to network communication patterns among VMs, based on VIOS implementations 415, 416 at respective hosts 400A, 400B, there is further detected a storage requirement, e.g., a number of hard disk drive resources 420 to maintain data consistency associated with the group 475 and which is to be dynamically restored with the VMs at the backup site in case of recovery.

In an embodiment, the method can further track historic (information technology) IT data such as: VM and storage resource usage, transactions, IT events, I/O patterns and source traffic, user selection patterns, patterns of communications among VMs, that are detected to determine the relationship of VMs and dockers (groups). Over time, particular configurations or rules are determined. That is, over time, based on continuous analyzing all network VM configurations at the active host site, a history of communications patterns, running applications, and associated memory storage resources is developed and stored as corresponding VM grouping patterns and/or rules in a database.

System 100 of FIG. 1, further provides for dynamic VM group membership control that keeps the defined group membership updated without user intervention and without requiring a user to re-do all the analysis and steps to add/delete the VM from the group. That is, as time progresses, in due course, if the network statistics or packet transmission pattern changes, the system can additionally update the VM group accordingly. For example, based on the analytics and stored patterns, the KSYS controller and analytics engine 145 can additionally define one or more groups of VMs nearest to this group to provide additional suggested groups to the user. This "nearness" is a logical proximity e.g., if in a current scenario there is a VM group containing five VMs running a DB client and 1 VM running a DB server. If the VM running DB server goes down, then by using the previously stored patterns, the system can check what all VM groups existed previously and which VM can take place of currently down VM that was running DB server in the VM group.

Figure 3B:
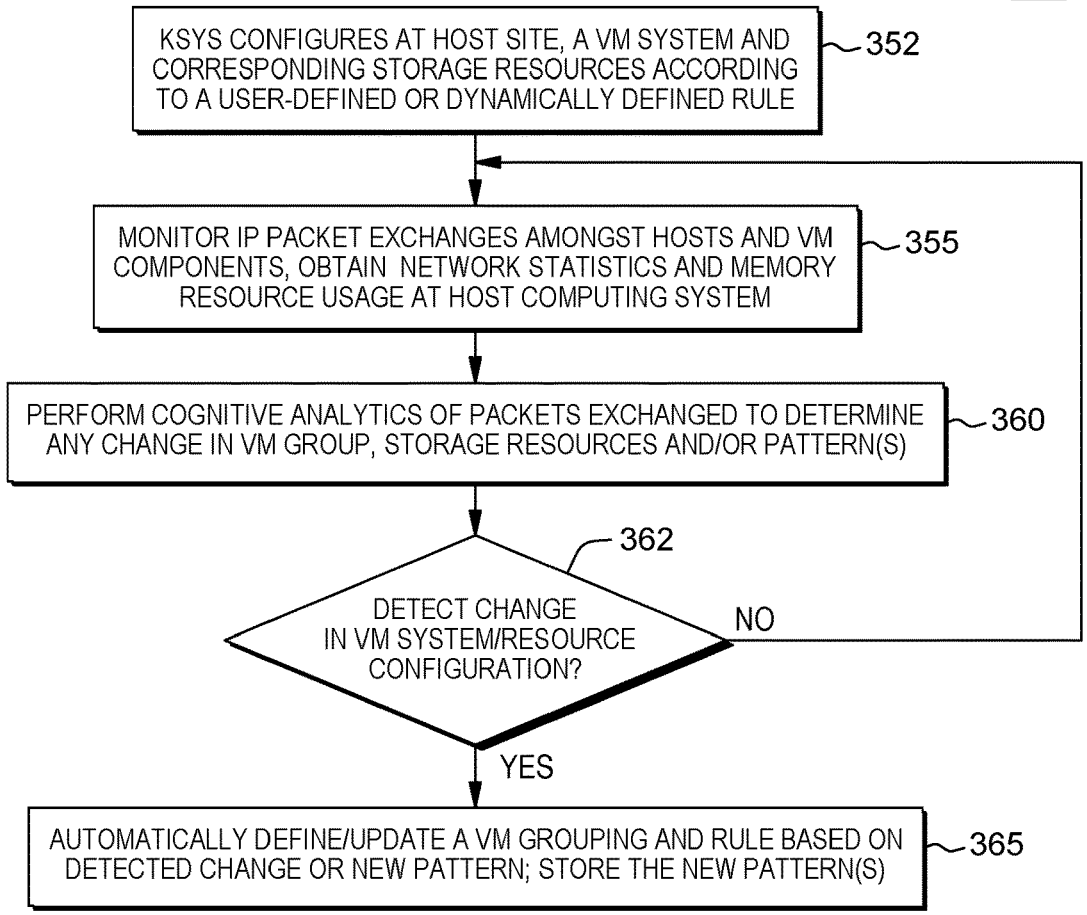
FIG. 3B depicts a flow chart indicating steps performed for updating a VM grouping based on further monitoring of IP packets exchanged and other network statistics analysis.

FIG. 3B depicts a further method 350 that dynamically updates or modifies a VM grouping membership. At 352, a KSYS control system 140 configures at a host site, according to a defined rule, a VM system including a group of VMs and corresponding storage disk resources. At 355, analytics engine 145 at the KSYS controller 140 can continually monitor network configurations (i.e., IP packet exchange patterns among VM components) at the current active host site 105. At 360, FIG. 3B, the analytics engine can make a determination as to whether there is detected a change in the VM system/resource configuration. If there is no detected change, the process continues back to 355 to continuously monitor the IP packet exchanges among VMs and the storage disks, at the host servers at the active site. Otherwise, at 360, if there is detected a change or modification in the VM system/resource configuration at the active host site, then the process at 365 can dynamically update or modify the current VM grouping based on the changed VM system/storage resource configuration in order to maintain current data consistency for data recovery purposes.

Generally, based on a defined or automatically generated rule, a VM grouping network/memory resource is configured accordingly at an active host site. If the control system finds any changes in the system (e.g., during discovery of information performed by control system or any notifications) that break the rule given by the user, it can send the notification to the user and remove a VM from the VM group. Additionally, if KSYS control system discovers any VM that also satisfies the user specified rules and DR requirements, that VM can be automatically added to the VM group.

Figure 5B:
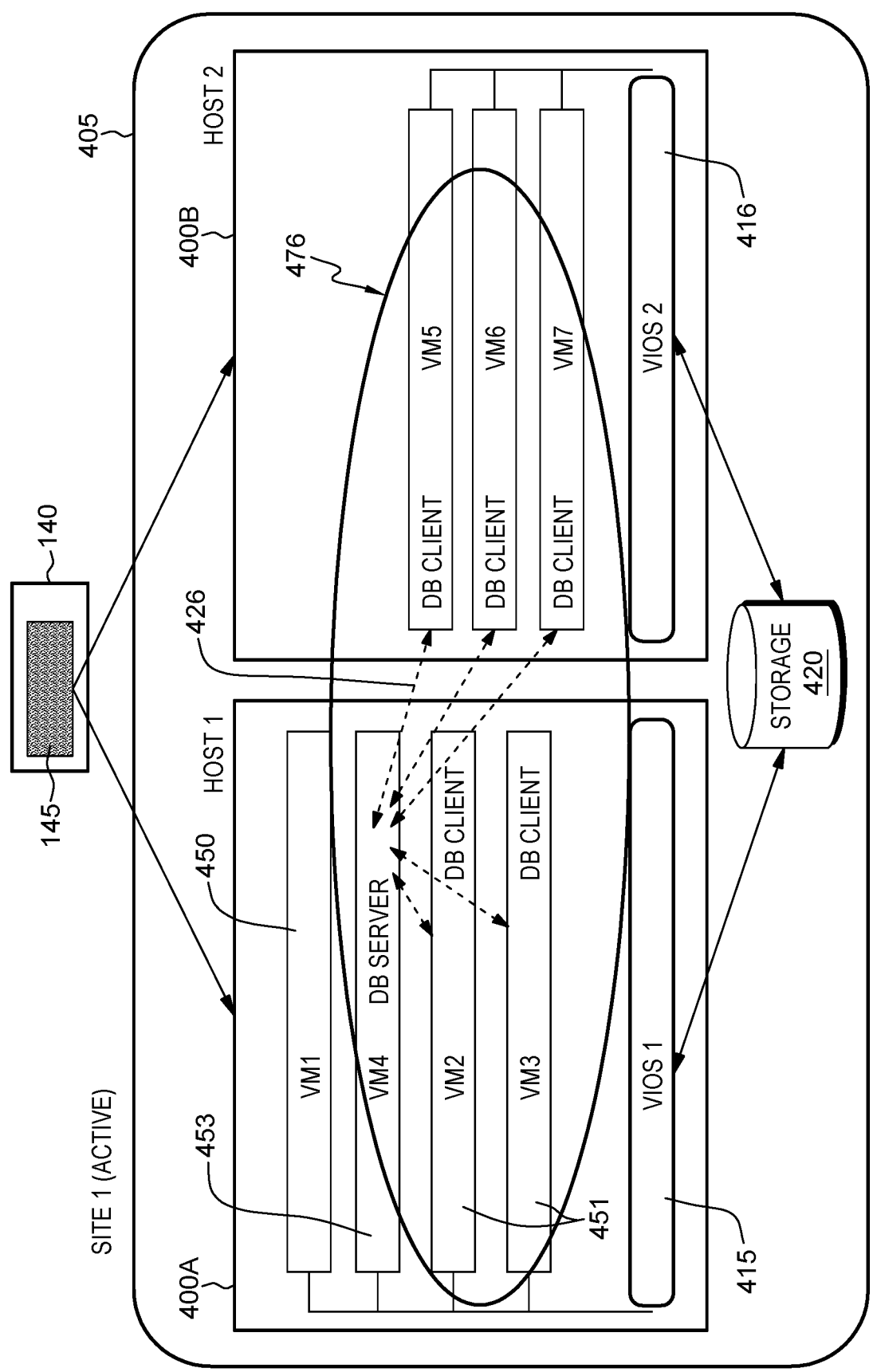
FIG. 5B depicts a dynamic VM grouping update based on IP packets exchanged based on the example VM system depicted in FIG. 5A.

FIG. 5B depicts a dynamic VM grouping update based on IP packets exchanged based on the example VM system depicted in FIGS. 4, 5A. In FIGS. 4, 5A, the KSYS controller 140 has configured the system according to a rule corresponding to an initial VM grouping pattern 475 formed with VMs 1, 2, 3, 5, 6 and 7 with VM1 acting as a DB server as was identified by analyzing the IP packets, the open ports and their modes like "LISTENING", "CONNECTED" by the applications using those ports. As shown in FIG. 5B, there is automatically detected, based on IP packets exchanged 426 and other network statistics analyses, that virtual machine 450 (e.g., VM1) hosting the installed dB server application, has terminated operating or has become off-line and stopped listening for database requests.

Then, in response, a user may start a new dB server application on a new VM 453 labeled as VM4 in FIG. 4C. Upon further network analysis performed, the VM group is updated as VM grouping 476 by removing VM1 and with adding virtual machine VM4 acting as new DB server as shown in FIG. 5B. A new rule may be automatically defined based on the new pattern corresponding to the modified VM grouping 476 (including VM4) and stored at the KSYS. Thus, at step 365, FIG. 3B, the KSYS may identify the new updated grouping 476 as the current configuration.

In the example configuration shown in FIG. 5B, should the system subsequently detect that the VM 453 (VM 4) hosting dB server application goes down and stops sending any IP response packets, the KSYS control system running the analytics engine can look at the previous stored patterns, compare the current configuration to the previous stored patterns, and immediately identify VM1 is most probable candidate for DB server should VM4 stop working. At this point, the control system 140 can inform the user that: VM4 where all the network requests were going is "down" now, and the user can use this information and can bring up the DB server on VM1. The VM1 can be added again to the VM group, removing VM4.

In an embodiment, using cognitive analytics, the KSYS can automatically perform pattern matching to quickly readjust a VM grouping, by identifying a nearest matching pattern based on the patterns stored from prior network VM groupings. For example, a target VM may be added or removed to a group based on the logical proximity. This updated grouping is used for disaster recovery and to ensure data consistency at a second recovery site should a disaster event occur at the active site.

Figure 6:
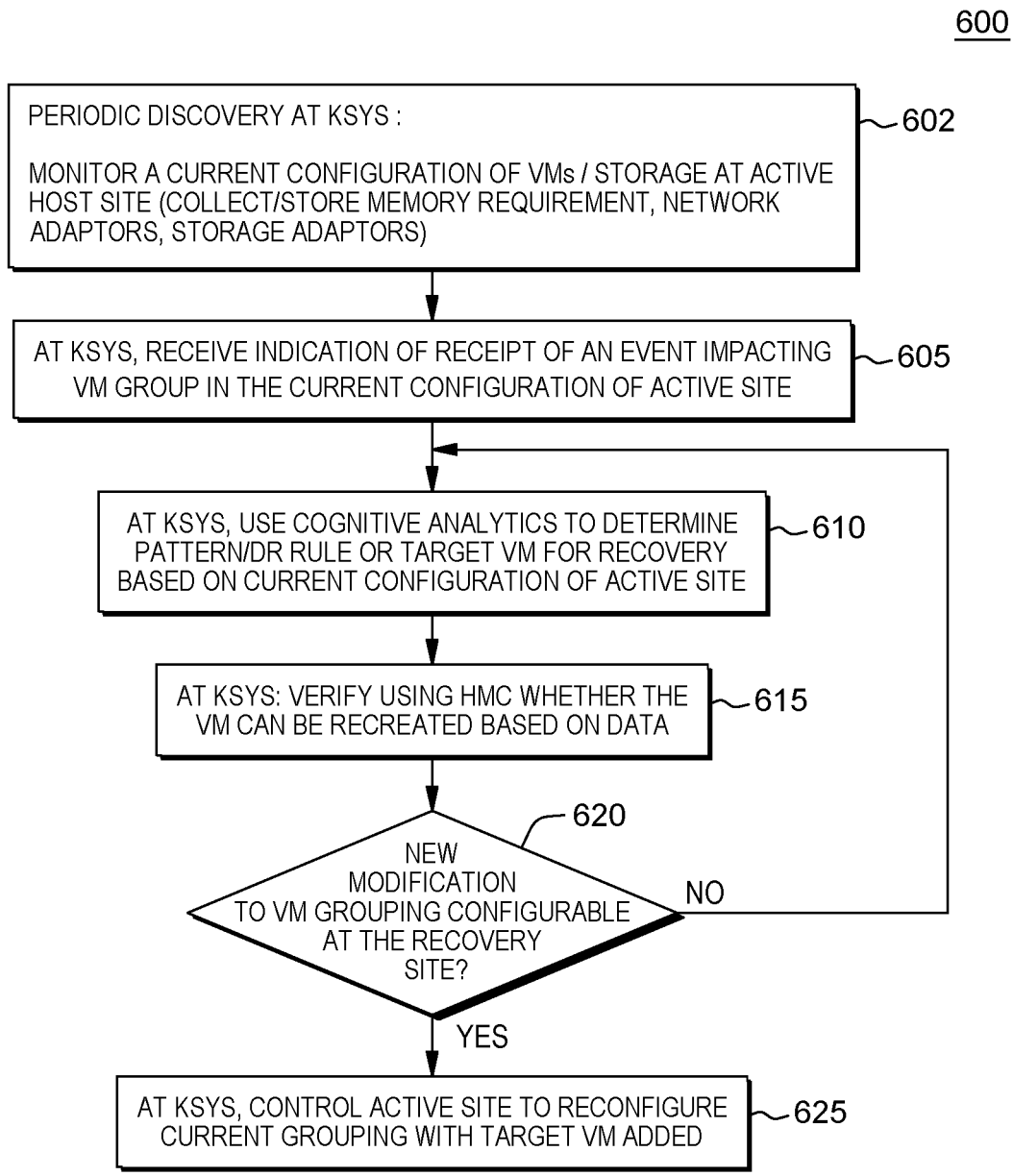
FIG. 6 shows a method using cognitive analytics at the KSYS controller for quickly readjusting a VM grouping at an active site in case of a detected event.

FIG. 6 shows a method for quickly readjusting a VM grouping at an active site. At 602, KSYS controller 140 VMs performs discovery, e.g., periodically, to monitor and detect the current configuration of grouped VMs/storage at active host site including monitoring the memory disks, network adaptors, storage adaptors, etc.

At 605, the KSYS receives an event indication from the active site HMC1 controller that there is an event impacting the current configured VM grouping, e.g., an event such as one or more VMs going off-line or terminating operations, at the active site. In response, at 610, based on the current configuration or rule at the active site, cognitive analytics are performed to analyze a target VM using other stored patterns or rules, e.g., to replace a VM in the impacted VM group by identifying the nearest matching patterns, and in case of multiple similar patterns, applying a weight based on one or more of: how many times the given pattern is/was selected, for how long the group based on current pattern is used, and whether it ensured data consistency, etc. In an embodiment, at 610, the KSYS controller, can search a plurality of patterns of VM groupings stored in a memory storage at the KSYS computer system specifying a similar grouping of VMs as the current VM network grouping at the one or more host computers at the first location. The KSYS analytics can compare the current VM grouping against the similar grouping of VMs associated with respective stored patterns and select a VM grouping based on its assigned weighting factor. For example, a similar grouping of VMs of close proximity that includes a candidate target VM to replace a terminated VM in the current network configuration and that ensures data consistency should a disaster event occur would be assigned a greater weight than other group patterns, e.g., that may not guarantee data consistency in the event of a disaster recovery situation. Then, based on the weighting factor associated with a new pattern or new rule, the KSYS can identify a target VM to replace a terminated VM in the current network configuration.

In an embodiment, at 610, cognitive analytics are used to automatically determine a rule that defines a replacement group of VMs and memory storage disks or alternatively a docker or container based on detected patterns that most closely replicates the VM grouping and that match data consistency requirements. That is, using a combination of network traffic and storage level disk group relations, VM groups of dependent dockers to maintain consistency at storage level during disaster recovery are identified. Thus, the KSYS will automatically determine the mapping to a stored pattern having VM groups, dockers, that most closely or exactly resembles the configuration at the failed host based on the applied weighting factor.

The KSYS controller, at 615, can then perform a verification process to ensure that the target VM, should it be added to the current VM network grouping and memory resource configuration, can be configured using the host computers at the recovery site 165. A determination is made at 620 to determine whether the target VM can be configured at the recovery site. If, at 620, a modified VM grouping is determined not configurable to ensure a data consistency at the recovery site, then the process can proceed back to step 610, where a new rule or target VM, based on its associated weight pattern, can be determined. The steps 610-620 are repeated until a suitable replacement target VM can be configured at the active site based on the detected modification.

Once, at 620, it is determined that a new rule or target VM is verified that can meet the requirements for disaster recovery and maintain a data consistency, the process proceeds to 625 where the KSYS can control HMC1 to reconfigure the current VM network grouping to include the target VM added at the active site. Thus, at 625, the KSYS automatically replaces one or more terminated VMs of the current grouping with the target VM to ensure maintenance of consistency of the network configuration at the one or more host computers at the active site and recovery site in case of DR.

Figure 7:
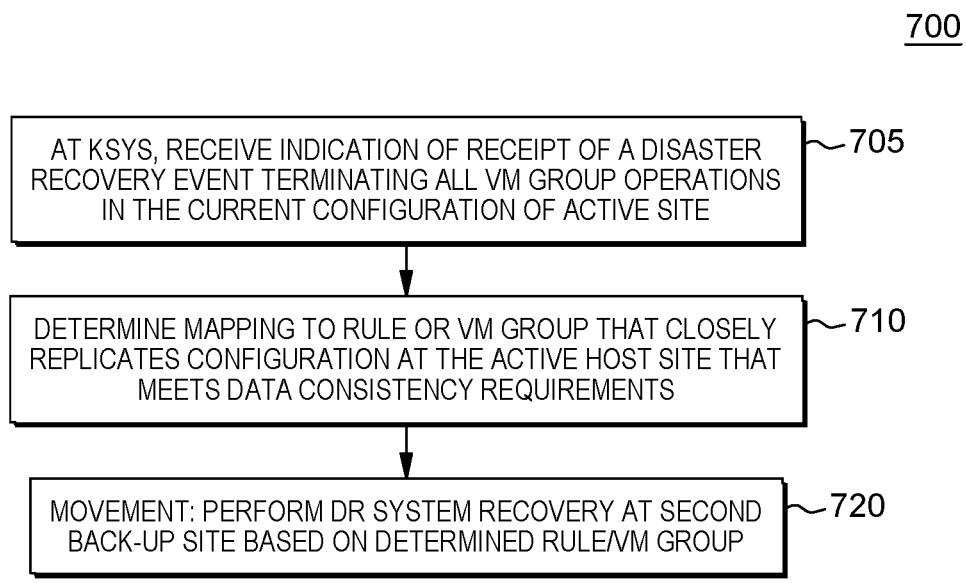
FIG. 7 depicts a method of disaster recovery in accordance with embodiments herein.

FIG. 7 depicts a method 700 of disaster recovery in accordance with embodiments herein. In an embodiment, the KSYS has configured the active site based on a user-defined rule and network analytics, and has verified that the configuration at the active site can be recovered at a recovery site. In an embodiment, a brand new VM grouping (or VM group membership adjustment) and memory resource configuration would not be committed without first verifying that all consistency and DR requirements are satisfied, i.e., the current configuration at the active site is configurable at a recovery site. At 705, the KSYS receives an indication of receipt of a disaster recovery event terminating all VM group operations in the current configuration of active site. At 710, the KSYS, in response, can automatically use the critical VM grouping and memory resources according to the configuration at the active site that has been prior verified to ensure that data consistency requirements can be maintained.

In an embodiment, at 710, the KSYS 140 can dynamically select a new VM grouping pattern or rule, e.g., according to its applied weighting factor, and, at 720, automatically control the virtual environment replication and recovery at the recovery site by automatically communicating commands over communication channel 144 for controlling the HMC2 to restore the critical VM grouping of the current operating virtual environment (VM) configuration at the server(s) at the recovery site.

Thus, using the cognitive analytics approach as described herein for automatic VM grouping saves much of an administrator's time and effort. The user need not to specify the list of VMs to be grouped, nor perform detailed analysis for each of the VM to check if it can be part of group or not. KSYS control system forms the group based on the cognitive analysis of data, or if the user has given a requirement in form of rules. KSYS control system collects all the required information of the VM to judge its candidature for a group and checks for storage and replication requirements to do DR for the grouped VMs. Dynamic VM group membership control will keep the group membership updated without user intervention. The user further does not need to redo all the analysis and steps to add/delete the VM from the group.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for configuring resources on one or more host computers comprising:
    configuring, using a control processor, at said one or more host computers, a current network grouping of VMs and an amount of memory storage resources to be hosted by one or more host computers located at a first location;
    monitoring, using the control processor, internet protocol (IP) packet exchange patterns between applications running on said VMs of said current network grouping of VMs at said one or more host computers at the first location;
    dynamically identifying, by said control processor, based on said monitored IP packet exchanges between said applications running on said VMs, a critical grouping of VMs and current memory storage resources at said one or more host computers running critical elements necessary to maintain a data consistency at a recovery site at a second location;
    detecting, at the control processor, an occurrence of an event terminating operations of the current network grouping of VMs at said one or more host computers at said first location; and
    in response to said detecting, automatically configuring, using said control processor, one or more host computers at said recovery site to host a related grouping of VMs and said corresponding amount of memory storage resources matched to said critical grouping of VMs and current memory storage resources at said host computing system necessary to maintain a data consistency in response to said event.

2. The method of claim 1, further comprising:
    detecting, at the control processor of said computing system, an occurrence of an event terminating one or more VMs or memory storage resources in the current network grouping of VMs at the one or more host computers at said first location;
    analyzing, by the control processor, said related grouping of VMs to determine one or more VMs at said one or more host computers for replacing said one or more terminating VMs; and in response to said detecting, adapting, using said control processor, one or more host computers at the first location to host the replacing one or more VMs in the current network grouping of VMs and said corresponding amount of memory storage resources.

3. The method of claim 2, further comprising:
verifying, using the control processor, whether said one or more host computers at a second location is able to host the identified related grouping of VMs and said corresponding amount of memory storage resources; and
responsive to said verifying, if said one or more host computers at a second location is not able to host the identified related grouping of VMs and said corresponding amount of memory storage resources, then
determining, using said control processor, a next closely matched network grouping of VMs and said corresponding amount of memory storage resources that can be configured on said one or more host computers at the second location, said next closely matched network grouping of VMs based on related additional network groupings of VMs associated with said prior configurations of network VM groupings.

4. The method of claim 3, said method further comprising:
receiving, from a user, via an interface to said computing system, a rule specifying a grouping of VMs to run on one or more host computers and corresponding memory storage resources for use by said group of VMs, said rule specifying a grouping of VMs according to an application model run on said group of VMs selected from: a peer-to-peer network model and a client-server model.

5. The method of claim 4, wherein said monitoring, using the control processor, internet protocol (IP) packet exchange patterns amongst VMs comprises:
using a host control processor to listen on socket communication links configured at said one or more host computers at said first location for packets communicated in association with applications running on a network configured at said one or more host computers;
running an analytics program at said control processor to identify based on said communicated packets, one or more of:
a pattern of network communications packet traffic among VMs and memory storage disks configured at one or more host computers and associated network performance statistics,
an input/output (I/O) pattern of communicated packets at said VMs and memory storage disks, and
one or more transactions between VMs; and
automatically determining, by said control processor, the related grouping of VMs based on said network packet communications traffic pattern, said I/O patterns, said one or more transactions, and associated network statistics, and
automatically generating, using the host control processor, a rule specifying the related grouping of VMs for configuration on said one or more host computers at said first and a corresponding amount of memory storage disk resources.

6. The method of claim 5, further comprising:
automatically determining, by said control processor, based on said network packet communications traffic and I/O patterns and associated network statistics, a related docker or container comprising a configuration of virtualized operating system level resources to be hosted at said one or more host computers and a corresponding amount of memory storage resources for configuration on said one or more host computers at said first location.

7. The method of claim 6, further comprising:
over time, for each prior configured network grouping of VMs and associated memory storage resources at said one or more host computers at said first location, using said control processor for:
identifying a respective pattern of network communications packet traffic among VMs and memory storage disks configured at one or more host computers and associated network performance statistics, input/output (I/O) pattern of communicated packets at said VMs and memory storage disks, and one or more transactions between VMs;
storing said identified patterns at a memory storage device associated with said control processor of said computer system;
running the analytics program at said control processor to identify, based on the stored patterns, additional network groupings of VMs associated with said prior configurations of network VM groupings; and
storing said additional network VM groupings associated with said prior configurations at said memory storage device associated with said computer system.

8. The method as claimed in claim 7, wherein said determining, by the control processor, one or more VMs at said one or more host computers for replacing said one or more terminating VMs in response to a detected event comprises:
searching, by said host control processor, a plurality of patterns stored in said memory storage at said computer system specifying a similar grouping of VMs as said current VM network grouping at said one or more host computers at said first location;
comparing, by said a host control processor, the current VM grouping against the similar grouping of VMs associated with respective stored patterns;
as a result of said comparing, applying, using said control processor, a weighting factor indicating an amount of times the similar grouping of VMs had been selected and for how long the similar grouping had been used, said similar grouping of VMs having a candidate target VM to replace a terminated VM in the current network configuration;
identifying, based on said weighting factor, a target virtual machine (VM) to replace a terminated VM in the current network configuration; and
automatically replacing said one or more terminated VMs of said current grouping with said target VM to maintain consistency of said network configuration at said one or more host computers at said first location.

9. A disaster recovery system for a datacenter running one or more host computers at a first location, said system comprising:
a computer system having a control processor;
a memory storage unit associated with said computer system, said memory storage unit storing instructions that are run by said control processor to configure said control processor to:
configure at said one or more host computers, a current network grouping of VMs and an amount of memory storage resources to be hosted by one or more host computers located at a first location;
monitor internet protocol (IP) packet exchange patterns between applications running on said VMs of said current network grouping of VMs at said one or more host computers at the first location;

dynamically identify based on said monitored IP packet exchanges between said applications running on said VMs, a critical grouping of VMs and current memory storage resources at said one or more host computers running critical elements necessary to maintain a data consistency at a recovery site at a second location;

detect an occurrence of an event terminating operations of the current network grouping of VMs at said one or more host computers at said first location; and in response to said detecting, automatically configure one or more host computers at said recovery site to host a related grouping of VMs and said corresponding amount of memory storage resources matched to said critical grouping of VMs and current memory storage resources at said host computing system necessary to maintain a data consistency in response to said event.

10. The system of claim 9, wherein said control processor is further configured to:

detect an occurrence of an event terminating one or more VMs or memory storage resources in the current network grouping of VMs at the one or more host computers at said first location;

analyze said related grouping of VMs to determine one or more VMs at said one or more host computers for replacing said one or more terminating VMs; and in response to said detecting, adapt one or more host computers at the first location to host the replacing VMs in the current network grouping of VMs and said corresponding amount of memory storage resources.

11. The system of claim 10, wherein said control processor is further configured to:

verify whether said one or more host computers at a second location is able to host the identified critical grouping of VMs and said corresponding amount of memory storage resources; and responsive to said verifying, if said one or more host computers at a second location is not able to host the identified related grouping of VMs and said corresponding amount of memory storage resources, then determine a next closely matched network grouping of VMs and said corresponding amount of memory storage resources that can be configured on said one or more host computers at the second location, said next closely matched network grouping of VMs based on related additional network groupings of VMs associated with said prior configurations of network VM groupings.

12. The system of claim 11, wherein said control processor is further configured to:

receive, from a user, via an interface to said computing system, a rule specifying a grouping of VMs to run on one or more host computers and corresponding memory storage resources for use by said group of VMs, said rule specifying a grouping of VMs according to an application model run on said group of VMs selected from: a peer-to-peer network model and a client-server model.

13. The system of claim 12, wherein to monitor Internet protocol (IP) packet exchange patterns amongst VMs, said control processor is further configured to:

listen on socket communication links configured at said one or more host computers at said first location for packets communicated in association with applications running on a network configured at said one or more host computers;

run an analytics program to identify based on said communicated packets, one or more of:

a pattern of network communications packet traffic among VMs and memory storage disks configured at one or more host computers and associated network performance statistics, an input/output (I/O) pattern of communicated packets at said VMs and memory storage disks, and one or more transactions between VMs; and automatically determine the related grouping of VMs based on said network packet communications traffic pattern, said I/O patterns, said one or more transactions, and associated network statistics, and automatically generate a rule specifying the critical grouping of VMs for configuration on said one or more host computers at said first and a corresponding amount of memory storage disk resources.

14. The system of claim 13, wherein said control processor is further configured to:

automatically determine based on said network packet communications traffic and I/O patterns and associated network statistics, a related docker or container comprising a configuration of virtualized operating system level resources to be hosted at said one or more host computers and a corresponding amount of memory storage resources for configuration on said one or more host computers at said first location, wherein a received specification comprises a docker or container of said virtualized operating system level resources, and said current network configuration at said one or more host computers comprising said virtualized machine resources corresponding to said received specification.

15. The system of claim 14, wherein said control processor is further configured to:

over time, for each prior configured network grouping of VMs and associated memory storage resources at said one or more host computers at said first location:

identify a respective pattern of network communications packet traffic among VMs and memory storage disks configured at one or more host computers and associated network performance statistics, input/output (I/O) pattern of communicated packets at said VMs and memory storage disks, and one or more transactions between VMs;

store said identified patterns at a memory storage device associated with said control processor of said computer system;

run the analytics program to identify, based on the stored patterns, related additional network groupings of VMs associated with said prior configurations of network VM groupings; and store said related additional network VM groupings associated with said prior configurations at said memory storage device associated with said computer system.

16. The method as claimed in claim 15, wherein to determine one or more VMs at said one or more host computers for replacing said one or more terminating VMs in response to a detected event, said control processor is further configured to:

search a plurality of patterns stored in said memory storage at said computer system specifying a similar grouping of VMs as said current VM network grouping at said one or more host computers at said first location;

compare the current VM grouping against the similar grouping of VMs associated with respective stored patterns;

as a result of said comparing, apply a weighting factor indicating an amount of times the similar grouping of VMs had been selected and for how long the similar grouping had been used, said similar grouping of VMs having a candidate target VM to replace a terminated VM in the current network configuration;

identify, based on said weighting factor, a target virtual machine (VM) to replace a terminated VM in the current network configuration; and automatically replace said one or more terminated VMs of said current grouping with said target VM to maintain consistency of said network configuration at said one or more host computers at said first location.

17. A computer program product comprising a non-transitory, computer-readable medium including instructions that, when executed by a hardware processor of a computer system, configure the hardware processor to perform a method comprising:

configuring, at said one or more host computers, a current network grouping of VMs and an amount of memory storage resources to be hosted by one or more host computers located at a first location;

monitoring internet protocol (IP) packet exchange patterns between applications running on said VMs of said current network grouping of VMs at said one or more host computers at the first location;

dynamically identifying based on said monitored IP packet exchanges between said applications running on said VMs, a critical grouping of VMs and current memory storage resources at said host computing system running critical elements necessary to maintain a data consistency at the recovery site;

detecting an occurrence of an event terminating operations of the current network grouping of VMs at said one or more host computers at said first location; and in response to said detecting, automatically configuring one or more host computers at said recovery site to host a related grouping of VMs and said corresponding amount of memory storage resources matched to said critical grouping of VMs and current memory storage resources at said host computing system necessary to maintain a data consistency in response to said event.

18. The computer program product of claim 17, wherein said instructions stored at said computer readable medium further configure the hardware processor to perform a method comprising:

detecting an occurrence of an event terminating one or more VMs or memory storage resources in the current network grouping of VMs at the one or more host computers at said first location; and analyzing said related grouping of VMs to determine one or more VMs at said one or more host computers for replacing said one or more terminating VMs; and in response to said detecting, adapting one or more host computers at the first location to host the replacing VMs in the current network grouping of VMs and said corresponding amount of memory storage resources.

19. The computer program product of claim 18, wherein said instructions stored at said computer readable medium further configure the hardware processor to perform a method comprising:

verifying whether said one or more host computers at a second location is able to host the identified related grouping of VMs and said corresponding amount of memory storage resources; and responsive to said verifying, if said one or more host computers at a second location is not able to host the identified related grouping of VMs and said corresponding amount of memory storage resources, then determining a next closely matched network grouping of VMs and said corresponding amount of memory storage resources that can be configured on said one or more host computers at the second location, said next closely matched network grouping of VMs based on related additional network groupings of VMs associated with said prior configurations of network VM groupings.

20. The computer program product of claim 19, wherein said instructions stored at said computer readable medium further configure the hardware processor to perform a method comprising:

over time, for each prior configured network grouping of VMs and associated memory storage resources at said one or more host computers at said first location, using said control processor for:

identifying a respective pattern of network communications packet traffic among VMs and memory storage disks configured at one or more host computers and associated network performance statistics, input/output (I/O) pattern of communicated packets at said VMs and memory storage disks, and one or more transactions between VMs;

storing said identified patterns at a memory storage device associated with said control processor of said computer system;

running the analytics program at said control processor to identify, based on the stored patterns, said related additional network groupings of VMs associated with said prior configurations of network VM groupings; and storing said related additional network VM groupings associated with said prior configurations at said memory storage device associated with said computer system.

* * * * *